United States Patent [19]

Shoda

[11] Patent Number: 4,775,181

[45] Date of Patent: Oct. 4, 1988

[54] REAR BODY STRUCTURE OF AUTOMOBILE

[75] Inventor: Mituyuki Shoda, Hiroshima, Japan

[73] Assignee: Mazda Motor Corporation, Hiroshima, Japan

[21] Appl. No.: 4,565

[22] Filed: Jan. 20, 1987

[30] Foreign Application Priority Data

Jan. 20, 1986 [JP] Japan .................. 61-6947[U]

[51] Int. Cl.$^4$ .................................. B62D 25/08
[52] U.S. Cl. .......................... 296/203; 296/202; 296/210; 296/213
[58] Field of Search ............ 296/187, 193, 195, 202, 296/203, 205, 210, 213

[56] References Cited

U.S. PATENT DOCUMENTS 4,634,173 1/1987 Aonuma et al. .................. 296/188

FOREIGN PATENT DOCUMENTS 0036117 3/1980 Japan .................. 296/194
0146420 11/1981 Japan .................. 296/201
60-43479 3/1985 Japan .

Primary Examiner—Dennis H. Pedder
Attorney, Agent, or Firm—Fleit, Jacobson, Cohn & Price

[57] ABSTRACT

A rear body structure of an automobile having a corner portion constituted by a rear header, rear pillar and roof side rail of a closed cross-section in which first and second extensions are integrally formed in a rear pillar outer panel and extend into the closed cross sections of the rear header and roof side rail so that the rear body structure is improved in rigidity. The closed cross-section is terminated half way in the transverse direction of the body. A hinge reinforcement is mounted in the vicinity of the end of the closed cross-section structure to reinforce the rear body structure.

8 Claims, 6 Drawing Sheets

REAR BODY STRUCTURE OF AUTOMOBILE

BACKGROUND OF THE INVENTION

1. Field of the invention

The present invention relates to a rear body structure of an automobile, more particularly to a connecting portion of a rear pillar, rear header, and roof side rail in the rear end of an automobile.

2. Description of the prior art

There is known a rear body structure of automobile which is of a hatch-back type having a corner portion in a rear end of the body wherein a rear pillar, rear header and roof side rail are interconnected with one another. In this type of structure, the corner portion is subjected to forces in the longitudinal, traverse, and up-and-down directions of the body. It will therefore be understood that the corner portion must have a sufficient strength against the forces acting in the various directions.

For this purpose, it has been proposed that the corner portion was constituted by utilizing a rear pillar, rear header, and roof side rail of a closed cross-section. However, the proposed rear body structure cannot provide sufficient strength.

With regard to the corner portion of the rear body structure, Japanese Utility Model Public Disclosure No. 60-43479, filed on Aug. 29, 1983 and laid-open to public inspection on Mar. 27, 1985, discloses a structure in which a rear header is extended outwardly in the transeverse direction of the body to be connected to a rear fender portion to thereby reduce the number of parts incorporated into the rear body structure and improve the dimensional accuracy of the assembly. However, the structure disclosed in the Japanese utility model application is inadequate in structural strength.

SUMMARY OF THE INVENTION

It is therefore an object of the present invention to provide a rear body structure of an automobile having improved strength.

It is another object of the present invention to provide a rear body structure which is suitable for hatch back type automobiles.

It is still another object of the present invention to provide a corner portion formed by the rear header, rear pillar and roof side rail which can withstand forces applied thereto in various directions.

According to the present invention, the above and other objects can be accomplished by a rear body structure comprising a rear pillar of a closed cross-section constituted by a pillar inner panel and a pillar outer panel, a rear header of a closed cross-section constituted by a rear header upper panel and a rear header inner panel, a roof side rail of a closed cross-section constituted by the pillar inner panel and a rear fender, said rear pillar, rear header and roof side rail being interconnected with one another, the pillar outer panel at the upper portion thereof being formed with first and second extensions extending toward the rear header and the roof side rail, and the extensions being interposed in a space defined by the closed cross-section so as to divide said space into small compartments. Preferably, at the rear end of the rear header, there is formed a transversely extending closed cross-section by the rear header inner panel and either the pillar outer panel or a roof panel. The first extension of the pillar outer panel may be connected to a hinge reinforcement for a back door.

According to the features of the present invention, there are interposed extensions of the rear pillar outer panel in the space defined by the closed cross-section so that the rear body structure of automobiles can be reinforced effectively.

BRIEF DESCRIPTION OF THE DRAWINGS

The above and other object of the present invention will become apparent from the following descriptions of a preferred embodiment taking reference to the accompanying drawings, in which.

DESCRIPTION OF THE PREFERRED EMBODIMENT

Figure 1:
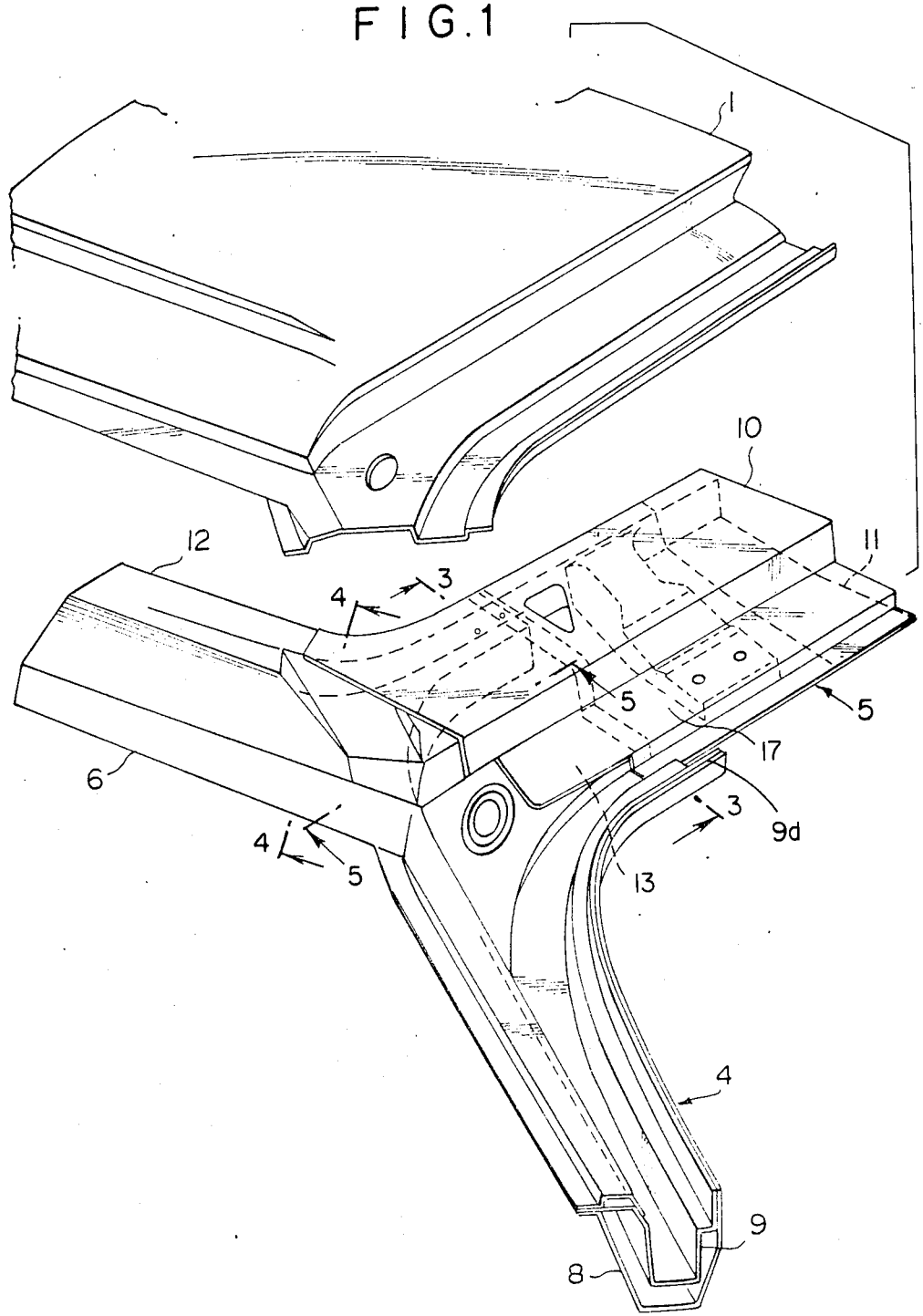
FIG. 1 is a perspective view of a rear body structure of an embodiment in accordance with the present invention.
Figure 6:
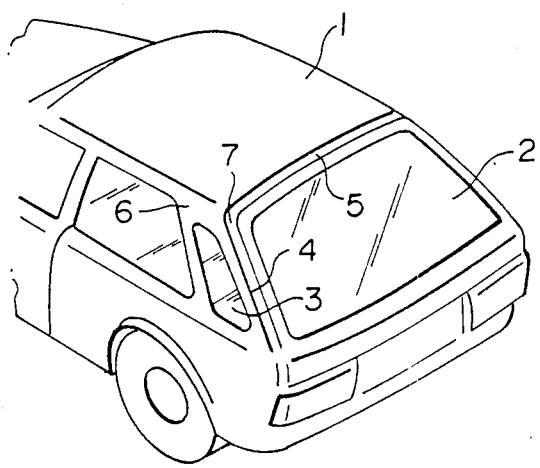
FIG. 6 is a schematic perspective view of an automobile to which the present invention can be applied.

Referring to the drawings, particularly to FIG. 1 and FIG. 6, there is shown in FIG. 6 an automobile of a hatch back type having a roof panel 1, a back door 2 and a quarter window 3. The present invention is directed to a corner portion 7 in which the panel 1, the back door 2 and the quarter window 3 are located adjacent to one another.

The corner portion 7 is formed by a rear pillar 4, a rear header 5 and a roof side rail 6 as shown in FIG. 1.

The rear pillar 4 disposed between the back door 2 and the quarter window 3 is constituted by connecting, preferably welding, flange portions 8a and 8c of a pillar inner panel 8 with flange portions 9a and 9c of a pillar outer panel 9 to form a closed cross-section structure.

The rear header 5 disposed between the roof panel 1 and the back door 2 is constituted by connecting flange portions 10a and 10c of a rear header upper panel 10 with flange portions 11a and 11c of a rear head inner panel 11 to form a closed cross-section structure.

The roof side rail 6 disposed between the roof panel 1 and the quarter window 3 is constituted by connecting the flange portions 8b and 8c of the pillar inner panel 8 with flange portions 12a and 12b of a rear fender 12 to form a closed cross-section structure.

Figure 5:
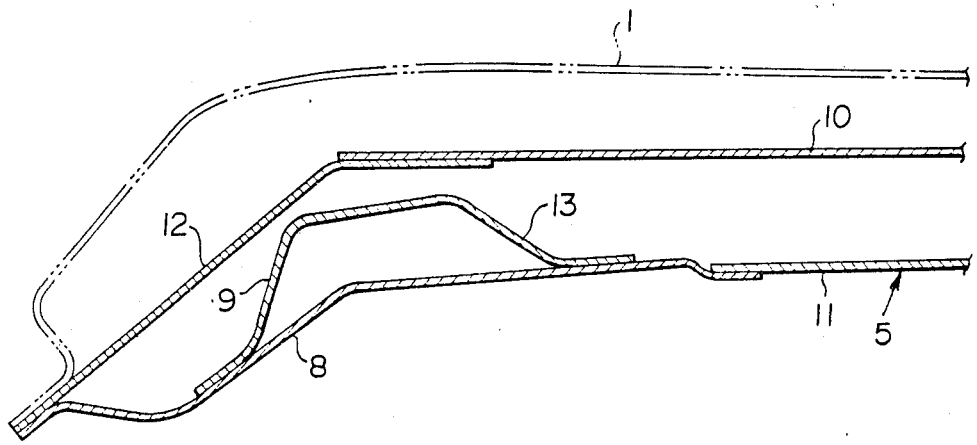
FIG. 5 is a sectional view taken substantially along the line C—C in FIG. 1.

As shown in FIG. 5, at one end in the transverse direction of the body, the rear header upper panel 10 is coupled with the upper end of the rear fender 12. The rear inner panel 8 is joined to the rear header inner panel 11 at the end portion thereof in the transverse direction of the body.

Figure 2:
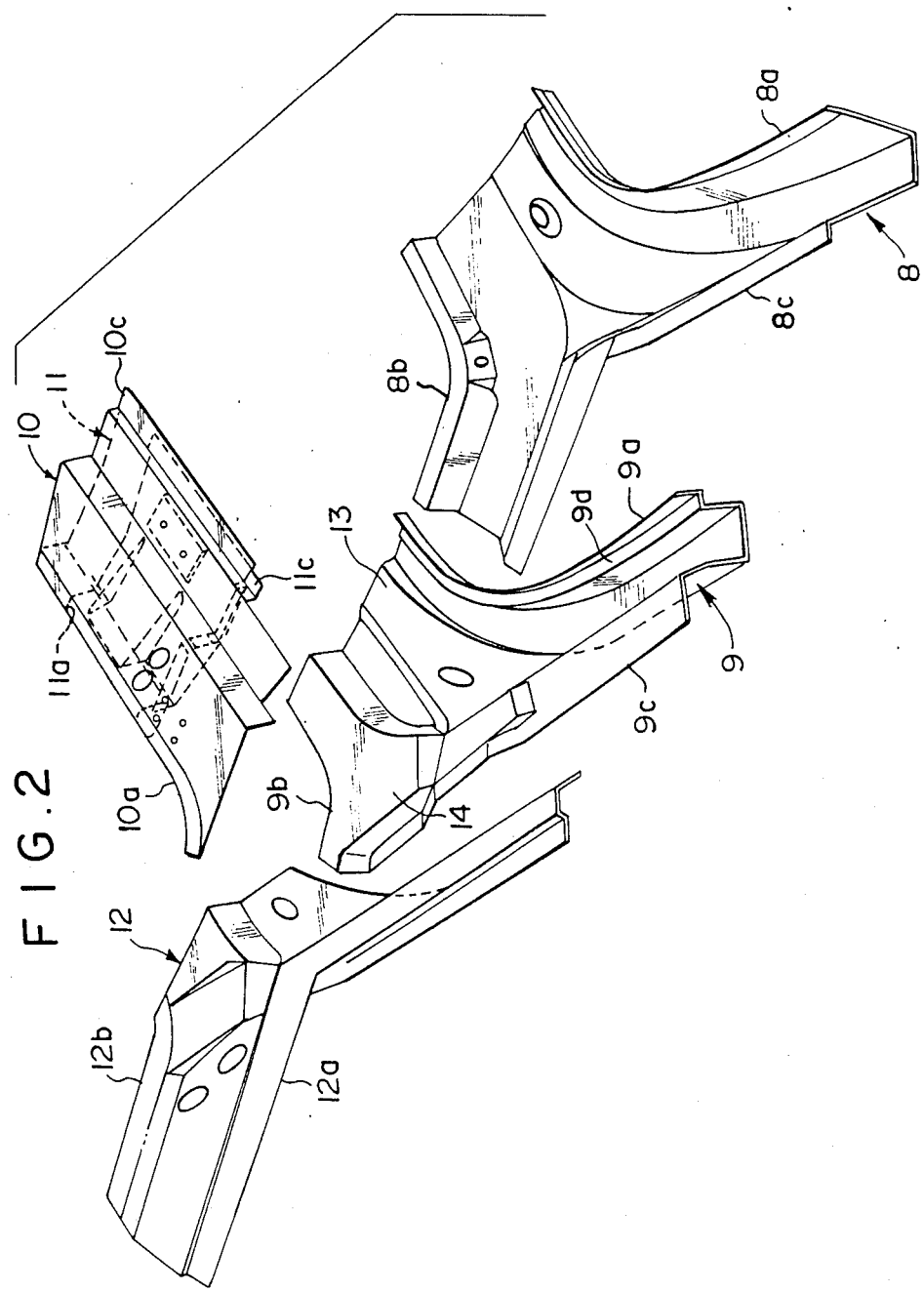
FIG. 2 is an exploded perspective view of a rear body structure illustrated in FIG. 1.

As shown in FIG. 2, the pillar outer panel 9 is integrally formed at the upper end portion thereof with a first extension 13 extending toward the rear header 5 and a second extension 14 extending toward the roof side rail 6. The peripheral portion 9d of the pillar outer panel has a U-shaped cross-section adjacent the door 2 to constitute a rain rail.

Figure 3:
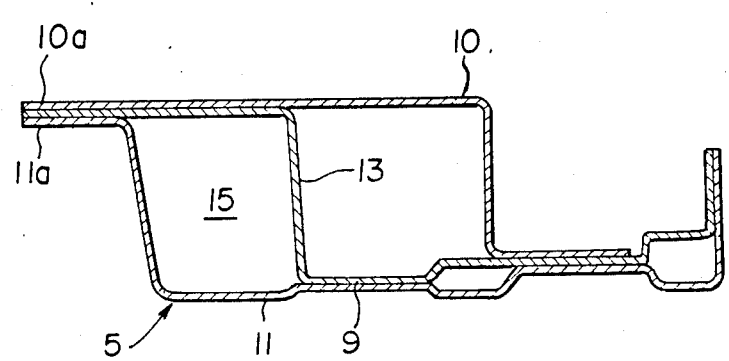
FIG. 3 is a sectional view taken substantially along the line A—A in FIG. 1.

The first extension 13, as shown in FIG. 3, is interposed between the rear header upper panel 10 and the rear header inner panel 11 to be welded therewith at one end portion. At the other end portion, the first extension 13 is coupled with the rear header inner panel 11 so that the first extension 13 divides a space 15 of the closed cross-section defined by the rear header upper panel 10 and the rear header inner panel 11 into two compartments.

Figure 4:
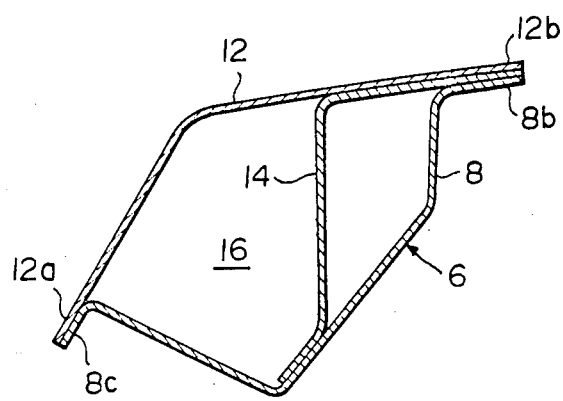
FIG. 4 is a sectional view taken substantially along the line B—B in FIG. 1.

The second extension 14, as shown in FIG. 4, is interposed between the rear fender 12 and the pillar inner panel 8 to be welded therewith at one end, and welded with the pillar inner panel 8 at the other end so that the second extension 14 divides a space 16 of the closed cross-section defined by the pillar inner panel 8 and the rear fender 12 into two compartments.

Figure 7:
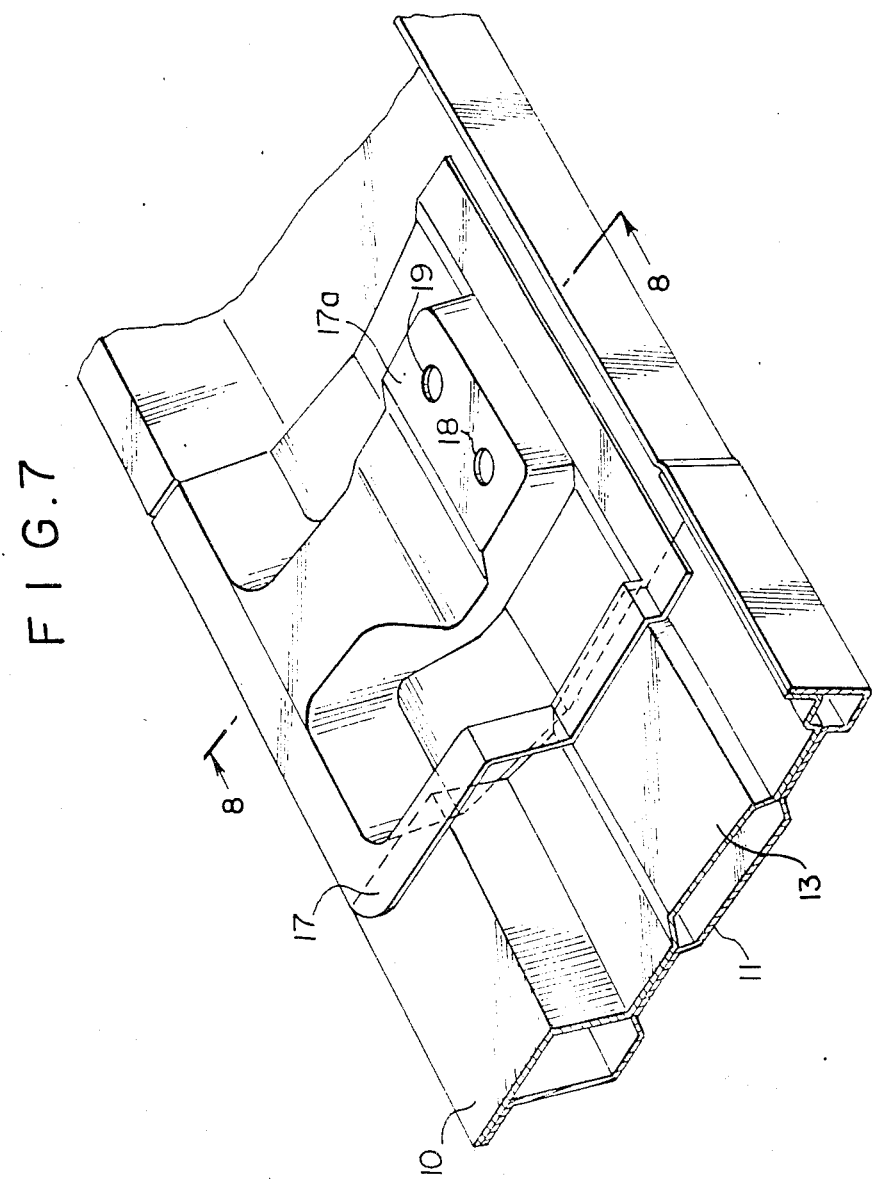
FIG. 7 is a fragmentary perspective view of a rear header.
Figure 8:
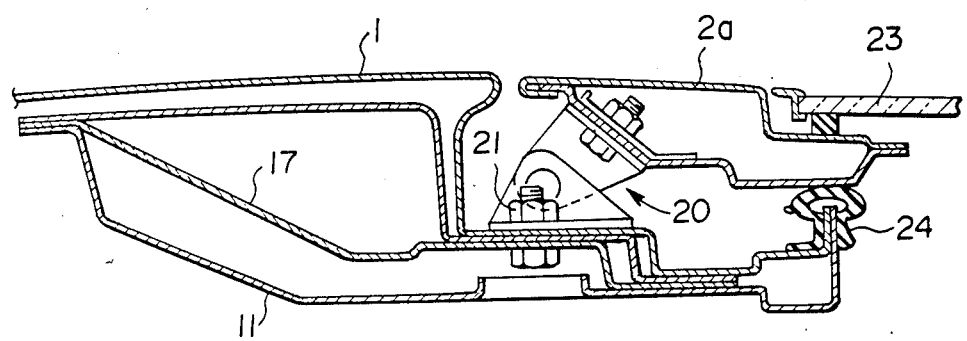
FIG. 8 is a sectional view taken along the line D—D in FIG. 7.

Now referring to FIG. 7 and FIG. 8, there is shown a hinge assembly for the back door 2. As shown in FIG. 7, the pillar outer panel 9 is terminated half way in the transverse direction of the body. At the end portion of the pillar outer panel 9, a hinge reinforcement 17 is joined to the first extension 13 in overlapped relationship. The reinforcement 17 is disposed to form a wall by which the end of the closed cross-section structure constituted by the rear header upper panel 10 and rear header inner panel 11 is closed in the transverse direction of the body. The hinge reinforcement 17 is formed with a projected portion 17a extending upwardly so that a closed cross-section structure is formed by the projected portion 17a and the rear header inner panel 11.

On the upper surface of the projected portion 17a, a hinge assembly 20 is mounted through openings 18, 19 by means of bolt members 21 at one end.

The hinge assembly 20 is jointed to the peripheral frame 2a of the back door 2 which holds a glass 22 so that the back door 2 can be pivotally moved around a pin 23 of the hinge assembly 20.

Further, the rear header upper panel 10 is joined to the rear header inner panel 11 at the rear end portion so as to form another closed cross-section structure so that the rigidity of the rear header 5 can be improved.

A weather strip 24 mounted at the rear end of the rear header 5, that is, the upper edge portion in the joined potion of the rear header upper panel 10 and rear header inner panel 11 is adapted to be brought into contact with the inner side of the back door frame 2a for sealing when the back door is in the closed position.

As described above, according to the present invention, the first and second extensions 13, and 14 are interposed in the spaces 15, 16 formed in the corner portion in the rear body structure and divide the space 15, 16 into two compartments respectively. It will therefore be understood that the extensions 13, 14 provide the corner portion with sufficient rigidity so that the automobile provided with the rear body structure in accordance with the present invention can withstand forces applied thereto in various directions such as, the longitudinal, transverse and up-and-down directions of the body.

I claim:

1. A rear body structure comprising a rear pillar of a closed cross-section constituted by a pillar inner panel and a pillar outer panel, a rear header of a closed cross-section constituted by a rear header upper panel and a rear header inner panel, a roof side rail of a closed cross-section constituted by the pillar inner panel and a rear fender, said rear pillar, rear header and roof side rail being interconnected with one another, the pillar outer panel at an upper portion thereof being formed with first and second extensions extending toward the rear header and the roof side rail, and each of the extensions being interposed in a respective one of the spaces defined by the closed cross-sections of the rear header and the roof side rail so as to divide said spaces into small compartments.

2. A rear body structure in accordance with claim 1 in which an opening for a back door is formed by the rear header and rear pillar, the back door being mounted on the rear header to be swingable between an open position and a closed position.

3. A rear body structure in accordance with claim 2 in which an end portion extending upwardly is formed adjacent to the rear header closed cross-section structure.

4. A rear body structure in accordance with claim 1 in which the pillar outer panel is of a substantially U-shape in section to constitute a rain rail in the peripheral portion of an opening for a back door.

5. A rear body structure in accordance with claim 2 in which the first extension of the pillar outer panel is connected to a hinge reinforcement for a back door.

6. A rear body structure in accordance with claim 5 in which the hinge reinforcement is formed with a projected portion projecting upwardly to constitute a closed cross-section in association with the rear header inner panel.

7. A rear body structure in accordance with claim 6 in which a hinge assembly is mounted on the upper surface of the projected portion.

8. A rear body structure in accordance with claim 7 in which the hinge reinforcement is disposed to form a wall by which the closed cross-section of the rear header is closed in the transverse direction of the body.

* * * * *